United States Patent [19]
Angelopoulos et al.

[11] Patent Number: 6,153,725
[45] Date of Patent: Nov. 28, 2000

[54] CONTROL OF POLYMERIZATION KINETICS AND RATE OF POLYMER PRECIPITATION AS A MEANS OF CONTROLLING THE AGGREGATION AND MORPHOLOGY IN CONDUCTIVE POLYMERS AND PRECURSORS THEREOF

[75] Inventors: Marie Angelopoulos, Cortlandt Manor, N.Y.; Richard Anthony DiPietro, San Jose, Calif.

[73] Assignee: International Business Machines Corporation, Armonk, N.Y.

[21] Appl. No.: 09/043,630

[22] PCT Filed: Jul. 24, 1997

[86] PCT No.: PCT/US97/13273

§ 371 Date: Jul. 17, 1998

§ 102(e) Date: Jul. 17, 1998

[87] PCT Pub. No.: WO98/04611

PCT Pub. Date: Feb. 5, 1998

Related U.S. Application Data

[60] Provisional application No. 60/022,706, Jul. 25, 1996.

[51] Int. Cl.$^7$ .................................................. C08G 73/00
[52] U.S. Cl. ...................... 528/422; 528/490; 528/491; 528/392; 528/388; 252/500; 252/518
[58] Field of Search .................................. 528/422, 490, 528/491, 392, 388; 252/500, 518

[56] References Cited

PUBLICATIONS

Chem Abstract 120:299367 "Thermochemistry and Kinetics of Chemical Polymerization of Anuiline determined by solution Calorimetry" Yueping et al.

Y. Fu et al., "Thermochemistry and Kinetics of Chemical Polymerization of Aniline Determined by Solution Calorimetry," American Chemical Society, 1994, p. 671–677.

*Primary Examiner*—Duc Truong
*Attorney, Agent, or Firm*—Daniel P. Morris

[57] ABSTRACT

The present invention is directed to methods of fabricating electrically conducting polymers and precursors thereof in which the polymer has a controlled level of aggregation and morphology. This is done by controlling the rate of polymerization and the rate at which the polymer precipitates from solution during the polymerization reaction. An additive is added to the polymerization medium, said additive increasing or decreasing the rate at which the polymer precipitates from the reaction medium. When said additive is a second organic solvent, the polymerization reaction proceeds homogeneously for a longer period of time than does the corresponding polymerization reaction which does not include said additive. Control of the polymerization kinetics allows control of the morphology for the isolated polymer and in turn control of the properties of these polymers.

23 Claims, 4 Drawing Sheets

CONTROL OF POLYMERIZATION KINETICS AND RATE OF POLYMER PRECIPITATION AS A MEANS OF CONTROLLING THE AGGREGATION AND MORPHOLOGY IN CONDUCTIVE POLYMERS AND PRECURSORS THEREOF

This application claims priority from Provisional Application U.S. Ser. No. 60/022,706 which was filed on Jul. 25, 1996.

CROSS REFERENCE TO RELATED APPLICATION

The teaching of U.S. application Ser. No. 09/043,622, filed on the same day herewith entitled, "OXIDATIVE/REDUCTIVE METHODS OF DEAGGREGATION OF ELECTRICALLY CONDUCTIVE POLYMERS AND PRECURSORS THEREOF AND METHODS OF FABRICATING PARTICLES THEREWITH" to M. Angelopoulos et al. is incorporated herein by reference.

The teaching of U.S. application Ser. No. 090/043,623, filed on the same day herewith entitled, "VIBRATIONAL METHODS OF DEAGGREGATION OF ELECTRICALLY CONDUCTIVE POLYMERS AND PRECURSORS THEREOF" to M. Angelopoulos et al. is incorporated herein by reference.

FIELD OF THE INVENTION

The present invention is directed to methods of controlling the polymerization kinetics and rate of polymer precipitation of electrically conducting polymers and precursors thereof. By so doing, electrically conducting polymers and precursors thereof are fabricated with controlled morphology and deaggregation. Such deaggregated conducting polymers and precursors thereof exhibit better processability and higher electrical conductivity than do the corresponding aggregated polymers.

BACKGROUND OF THE INVENTION

Electrically conductive organic polymers have been of scientific and technological interest since the late 1970's. These relatively new materials exhibit the electronic and magnetic properties characteristic of metals while retaining the physical and mechanical properties associated with conventional organic polymers. Herein we describe electrically conducting polymers, for example polyparaphenylene vinylenes, polyparaphenylenes, polyanilines, polythiophenes, polyazines, polyfuranes, polypyrroles, polyselenophenes, poly-p-phenylene sulfides, polythianapthenes, polyacetylenes formed from soluble precursors, combinations thereof and blends thereof with other polymers and copolymers of the monomers thereof.

These polymers are conjugated systems which are made electrically conducting by doping. The non-doped or non-conducting form of the polymer is referred to herein as the precursor to the electrically conducting polymer. The doped or conducting form of the polymer is referred to herein as the conducting polymer.

Conducting polymers have potential for a large number of applications in such areas as electrostatic charge/discharge (ESC/ESD) protection, electromagnetic interference (EMI) shielding, resists, electroplating, corrosion protection of metals and ultimately metal replacements, i.e. wiring, plastic microcircuits, conducting pastes for various interconnection technologies (solder alternative) etc. Many of the above applications especially those requiring high current capacity have not yet been realized because the conductivity of the processable conducting polymers is not yet adequate for such applications. In order for these materials to be used in place of metals in more applications, it is desirable to increase the conductivity of these materials. In addition, the processability of these polymers also requires improvement. Although some of these polymers are soluble, the solubility is generally limited and the solutions tend to be not stable over time.

The polyaniline class of conducting polymers has been shown to be one of the most promising and most suited conducting polymers for a broad range of commercial applications. The polymer has excellent environmental stability and offers a simple, one-step synthesis. However, the conductivity of the material in its most general form (unsubstituted polyaniline doped with hydrochloric acid) is generally on the low end of the metallic regime most typically, on the order of 1 to 10 S/cm (A.G. Macdiarmid and A. J. Epstein, Faraday Discuss. Chem. Soc. 88, 317, 1989). In addition, the processability of this class of polymers require improvement. Although polyaniline is a soluble polymer, it has been noted that the solutions tend to be unstable with time. (E.J. OH et al, Synth. Met. 55–57, 977 (1993). Solutions of for example the polyaniline in the non-doped form tend to gel upon standing. Solutions greater than 5% solids concentration tend to gel within hours limiting the applicability of the polymer. It is desirable to devise methods of increasing the electrical conductivity of the doped polyanilines and to enhance the processability of these systems to allow broader applicability.

The conductivity ($\sigma$) is dependent on the number of carriers (n) set by the doping level, the charge on the carriers (q) and on the mobility ($\mu$) (both interchain and intrachain mobility) of the carriers.

$$\sigma = nq\mu$$

Generally, n (the number of carriers) in these systems is maximized and thus, the conductivity is dependent on the mobility of the carriers. To achieve higher conductivity, the mobility in these systems needs to be increased. The mobility, in turn, depends on the morphology of the polymer. The intrachain mobility depends on the degree of conjugation along the chain, presence of defects, and on the chain conformation. The interchain mobility depends on the interchain interactions, the interchain distance, and the degree of crystallinity. Thus, the conductivity is very dependent on the morphology of the polymer.

Recently, it has been shown that polyaniline in the non-doped form has a tendency to aggregate as a result of interchain hydrogen bonding and that this aggregation limits the solvation of the polymer (U.S. application Ser. No. 08/370,127 filed on Jan. 9, 1995 and U.S. application Ser. No. 08/370,128 filed on Jan. 9, 1995, the teachings of which are incorporated herein by reference. It was found that certain additives such as lithium chloride could be added to the polyaniline to disrupt the aggregation. As the aggregation was disrupted, the chains became disentangled frown each other and the solvent was able to more effectively solvate the chains to adapt a more expanded chain conformation. As a result, the deaggregated polymer upon doping exhibited higher levels of conductivity than did the polymer in the aggregated form. In addition, it was found that the deaggregated solutions were more stable with time than the corresponding aggregated solutions.

Herein novel methods of deaggregating conducting polymers and precursors thereof are described. These are methods of controlling the polymerization kinetics and the rate of polymer precipitation during the polymerization reaction of these polymers. By so doing, the morphology of these polymers can be controlled and the solubility of the polymers enhanced.

OBJECTS

It is an object of the present invention to control the level of aggregation in electrically conducting polymers and precursors thereof.

It is an object of the present invention to control the morphology of electrically conducting polymers and precursors thereof.

It is an object of the present invention to deaggregate aggregated molecules which are precursors to the electrically conducting polymers.

It is an object of the present invention to deaggregate aggregated molecules which are precursors to the electrically conducting polymers so that the molecules can be more uniformly doped.

It is an object of the present invention to deaggregate aggregated molecules which are precursors to the electrically conducting polymers so that the molecules can exhibit high conductivity upon doping.

It is an object of the present invention to deaggregate aggregated molecules which are precursors to the electrically conducting polymers so that the molecules can exhibit good processability and good solution stability.

It is an object of the present invention to deaggregate aggregated molecules which are precursors to the electrically conducting polymers so that the molecules can be more effectively processed into films, fibers, or any structural form.

It is an object of the present invention to deaggregate aggregated molecules which are precursors to the electrically conducting polymers so that the molecules can be more effectively processed into films, fibers, or any structural form having tunable morphology and mechanical/physical properties.

It is an object of the present invention to deaggregate aggregated molecules which are electrically conducting polymers.

It is an object of the present invention to deaggregate aggregated molecules which are electrically conducting polymers so that the molecules can exhibit good processability and good solution stability.

It is an object of the present invention to deaggregate aggregated molecules which are electrically conducting polymers so that the molecules can be more effectively processed into films, fibers, or any structural form.

It is an object of the present invention to deaggregate aggregated molecules which are electrically conducting polymers so that the molecules can be more effectively processed into films, fibers, or any structural form having tunable morphology and mechanical/physical properties.

It is an object of the present invention to increase the level of aggregation in electrically conducting polymer and precursors thereof It is an object of the present invention to increase the electrical conductivity of electrically conductive polymers.

It is another object of the present invention to increase the electrical conductivity of electrically conductive polymers by extending the electrically conductive regions or islands of the electrically conductive polymer.

It is another object of the present invention to further increase the electrical conductivity of a deaggregated electrically conductive polymer by stretch orientation.

SUMMARY OF THE INVENTION

A broad aspect of the present invention is a method for fabricating electrically conducting polymers and precursors to electrically conducting polymers in which the level of aggregation and the morphology are controlled and tunable.

A more specific aspect of a method of the present invention is the control of the level of aggregation and morphology of electrically conducting polymers and precursors thereof by controlling the polymerization kinetics and the rate of polymer precipitation during the polymerization reaction of these polymers.

Another more specific aspect of a method of the present invention is the control of the polymerization kinetics and the rate of polymer precipitation by controlling the amount of oxidant used in the polymerization reaction.

Another more specific aspect of a method of the present invention is the control of the polymerization kinetics and the rate of polymer precipitation during the polymerization reaction by the addition of a solvent or additive to the reaction mixture that slows the rate at which the polymer precipitates from the reaction mixture.

Another more specific aspect of a method of the present invention includes deaggregating precursors to electrically conducting polymers or electrically conducting polymers during the polymerization of these materials by controlling the polymerization kinetics and the rate of polymer precipitation.

BRIEF DESCRIPTION OF THE DRAWINGS

Further objects, features, and advantages of the present invention will become apparent from a consideration of the following detailed description of the invention when read in conjunction with the drawing FIGS., in which:

FIG. 1 is a general formula for a polyaniline; (a) is the precursor form of the polymer or the non-doped form of the polymer; (b) is the doped form of the polymer or the electrically conducting form of polyaniline; (c) is the actual structure for the doped electrically conducting polymer consisting of a polysemiquinone radical cation.

FIG. 3 depicts gel permeation chromatographs(GPC) for polyaniline base in NMP. (a) polyaniine polymerized with 1:0.25 aniline/oxidant molar ratio (b) polyaniline polymerized with 1:0.5 aniline/oxidant molar ratio.

FIG. 4 depicts gel permeation chromatographs(GPC) for polyaniline base in NMP. (a) polyaniine polymerized with 1:0.75 aniline/oxidant molar ratio (b) polyaniline polymerized with 1:1 aniline/oxidant molar ratio.

DETAILED DESCRIPTION

The present invention is directed to methods of controlling the level of aggregation and the morphology of electrically conducting polymer precursors and electrically conducting polymers. Examples of such polymers that can be used to practice the present invention are of substituted and unsubstituted polyparaphenylenes, polyparaphenylevevinylenes, polyanilines, polyazines, polythiophenes, poly-p-phenylene sulfides, polyfuranes, polypyrroles, polyselenophenes, polyacetylenes formed from soluble precursors and combinations thereof and copolymers of monomers thereof. The general formula for these polymers can be found in U.S. Pat. No. 5,198,153 to Angelopoulos et al. the teaching of which is incorporated herein by reference. Polymerizable units from which these polymers can be formed are described in U.S. Pat. No. 5,370,825 to Angelopoulos et al. the teaching of which is incorporated herein by reference. The present invention will be described with reference to one type of polymer which is a substituted or unsubstituted polyaniline or copolymers of polyaniline having general formula shown in FIG. 1 wherein each R can be H or any organic or inorganic radical; each R can be the same or different; wherein each $R^1$ can be H or any organic or inorganic radical, each $R^1$ can be the same or different; $x \geq 1$; preferably $x \geq 2$ and y has a value from 0 to 1. Examples of organic radicals are alkyl or aryl radicals. Examples of inorganic radicals are Si and Ge. This list is exemplary only and not limiting.

Figure 1A:
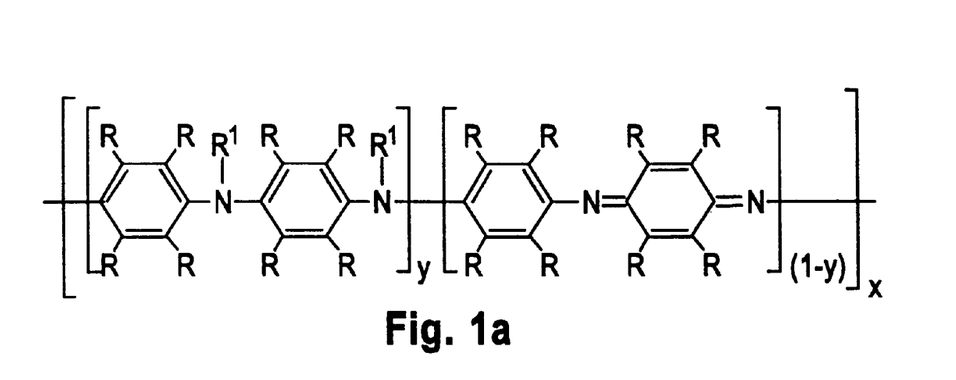
Figure 1B:
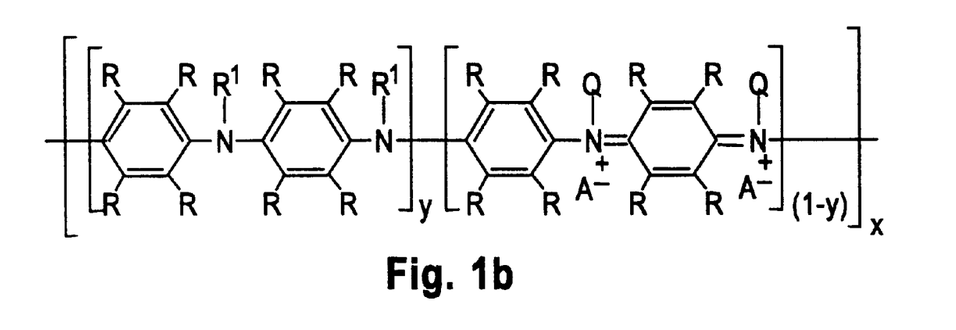

The precursor to the electrically conducting polymer form is shown in FIG. 1a. This is the non-doped form of the polymer or the base polymer. FIG. 1b shows polyaniline doped with a dopant. If the polyaniline base is exposed to cationic species QA, the nitrogen atoms of the imine part of the polymer becomes substituted with the Q+cation to form an emeraldine salt as shown in FIG. 1b. Q+ can be selected from H+ and organic or inorganic cations, for example, an alkyl group or a metal.

QA can be a protic acid where Q is hydrogen. When a protic acid HA is used to dope the polyaniline, the nitrogen atoms of the imine part of the polyaniline are protonated.

Figure 1C:
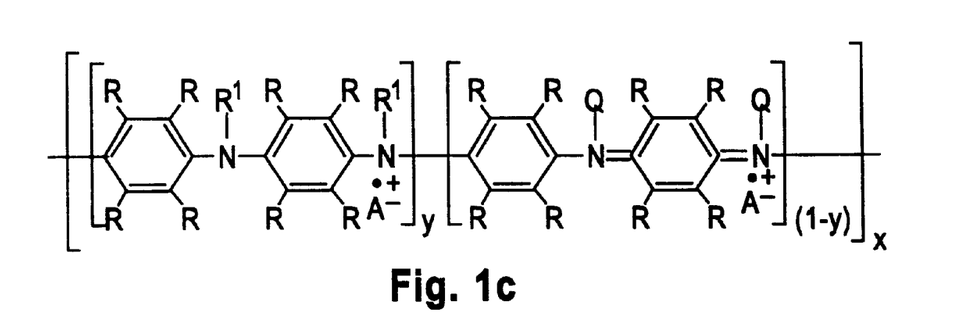

The emeraldine base form is greatly stabilized by resonance effects. The charges distribute through the nitrogen atoms and aromatic rings making the imine and amine nitrogens indistinguishable. The actual structure of the doped form is a delocalized polysemiquinone radical cation as shown in FIG. 1c.

Polyaniline can exist in a number of oxidation states. The emeraldine form of the polymer refers to the material that consists of approximately equal number of benzenoid units and quinoid units ($y = \approx 0.5$ in FIG. 1). The emeraldine polymer can be reduced to the leucoemeraldine polymer where y=1 in FIG. 1. The leucoemeraldine base form of the polymer is not stable in ambient conditions. The emeraldine polymer can be oxidized to the pernigraniline form where y=0; however, the fully oxidized form of the polymer also tends not to be stable. In principle, other oxidation states intermediate between y=0 and y=1 are possible. The emeraldine base form of the polyaniline is the most stable form. Because of its environmental stability, it is the form of polyaniline that has been the most abundantly studied and is the form that is suited for technological applications. The most preferred embodiment of the present invention is emeraldine base form of the polyaniline wherein y has a value of approximately 0.5.

The emeraldine base form of polyaniline is soluble in various organic solvents and in various aqueous acid solutions. Examples of organic solvents are dimethylsulfoxide (DMSO), dimethylformamide (DMF), N-methylpyrrolidinone (NMP), N,N'dimethyl propylene urea (DMPU), pyridine, m-cresol, phenol. This list is exemplary only and not limiting. Examples of aqueous acid solutions is aqueous acetic acid and formic acid solutions. This list is exemplary only and not limiting.

Figure 2:
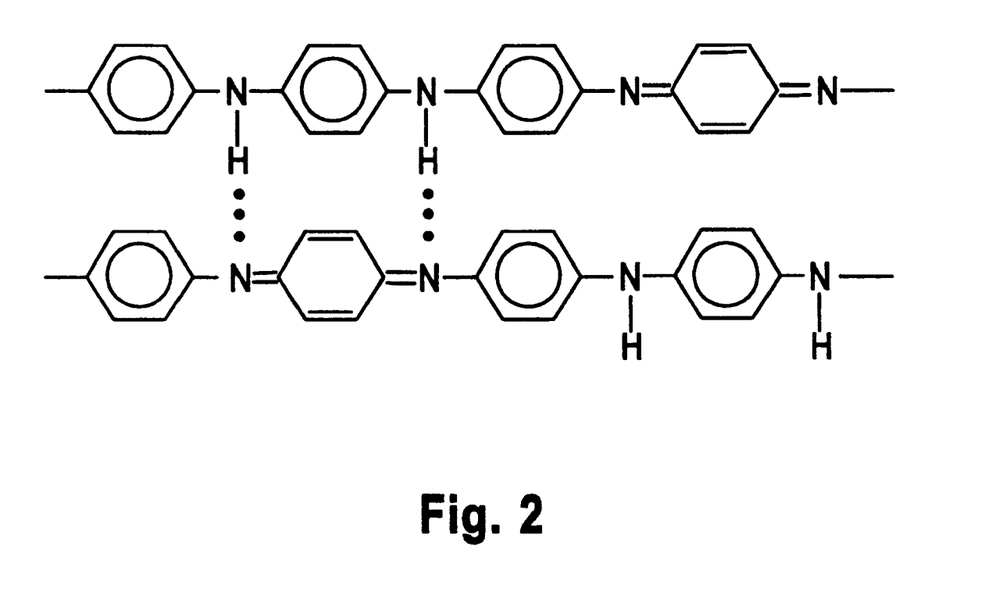
FIG. 2 depicts interchain hydrogen bonding in emeraldine base between an amine site of one chain and an imine site of a second chain.

Previously we disclosed (U.S. Ser. No. 08/370,127 filed on Jan. 9, 1995 and U.S. application Ser. No. 08/370,128 filed on Jan. 9, 1995, the teachings of which are incorporated herein by reference.) that polyaniline in the emeraldine base form aggregates as a result of interchain hydrogen bonding between the amine and imine sites as shown schematically in FIG. 2. These aggregates were evidenced by a bimodal molecular weight distribution in gel permeation chromatography. Emeraldine base in NMP for example exhibits a bimodal distribution consisting of high molecular weight fractions. This high molecular weight fraction is due to chain aggregation resulting in "pseudo" high molecular weights. Previously we disclosed that certain additives such as lithium chloride could be added to these solutions to disrupt the hydrogen bonding and in turn reduce or eliminate the high molecular weight fractions. Herein, we disclose novel methods of controlling the aggregation in polyaniline by controlling the polymerization kinetics and rate of polymer precipitation during the synthesis.

Polyaniline is synthesized by the chemical oxidation of the appropriate aniline monomer using an oxidant such as ammonium peroxydisulfate (A. G. MacDiarmid et al, in Conducting Polymers, Alcacer L., Ed., Reidel Publications, Dordrecht, Holland, 105 (1987). The reaction is done in aqueous acid solution such as hydrochloric acid. The aniline monomer is dissolved in aqueous acid and an aqueous acid solution of the oxidant is added to the aniline monomer. The aniline/oxidant molar ratio used is 1 to 0.25. Upon addition of the oxidant to the aniline monomer, the monomer is oxidized and the polymer is formed. Within minutes of the addition of the oxidant, the polymer precipitates from the reaction medium. The reaction is then allowed to continue for several hours. During this time, the reaction is proceeding heterogeneously as the polymer has precipitated from the solution whereas the oxidant is still dissolved in solution. In contradistinction, in a homogeneous reaction all reactants are in the same phase, i.e. in solution.

Authors have found that the rate at which the polymer is formed and the rate at which it precipitates from solution significantly impacts the morphology of the polymer such as the aggregation. If the polymer precipitates too soon from the reaction medium, it does not get the opportunity for the solvent to solvate the polymer to allow the chains to disentangle from each other and to expand. As the polymer precipitates, it basically associates predominantly with itself and less so with the reaction medium. Whereas, if the polymer remains soluble in the reaction medium, more solvent/polymer interactions would be prevalent. Thus, it is important to control the rate at which the polymer forms and precipitates. One of the reasons that the polymer precipitates from the reaction medium is that the reaction medium is aqueous acid and the formed polymer does not dissolve in this medium.

Figure 3A:
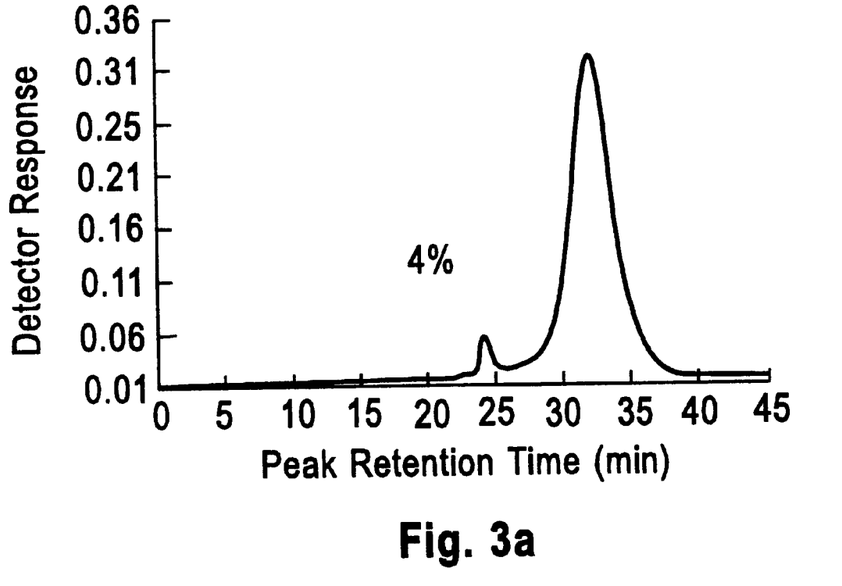
Figure 3B:
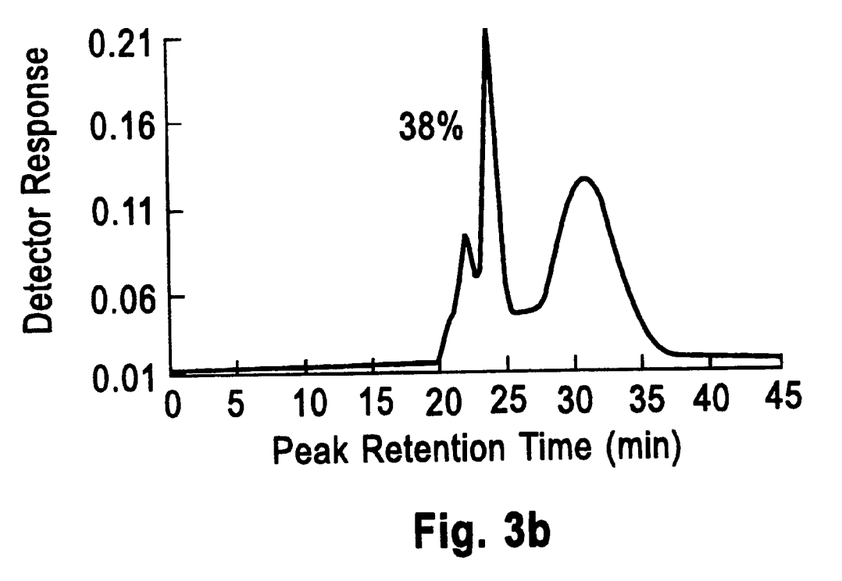
Figure 4A:
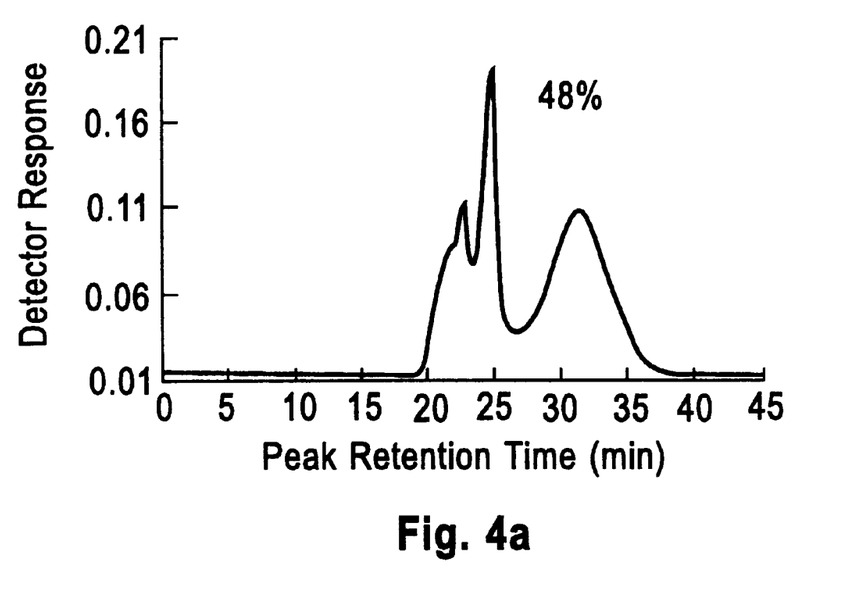
Figure 4B:
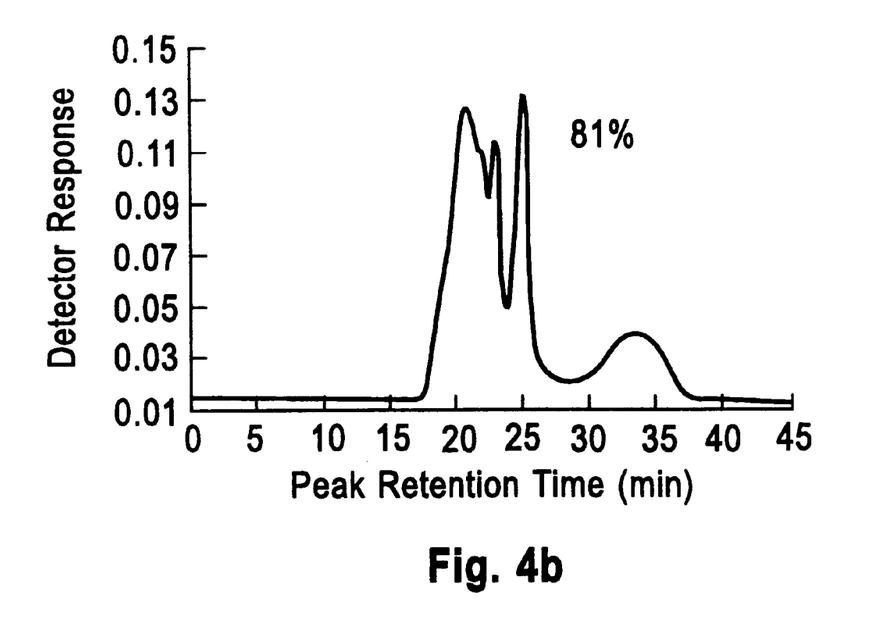

It is found that changing the amount of oxidant dramatically impacts the aggregation level in polyaniline. Polyaniline was synthesized using aniline/oxidant molar ratios of 1:0.25, 1:0.5, 1.0.75, and 1:1 (all other polymerization conditions were kept constant for all of these experiments). As the oxidant level was increased, the polymer appeared to precipitate more quickly from the reaction medium. In addition, the level of aggregation as evidenced by the area of the high molecular weight fractions for these polymers dramatically increased. FIGS. 3 and 4 depict the gel permeation chromatography for the polyaniline samples made with 1:0.25 (3a), 1:0.5 (3b), 1:0.75 (4a) and 1:1 (4b). As can be seen, the area of the high molecular weight fraction increases from 4% to 38% to 48% to 81% as the oxidant level increases from 1:0.25 to 1:1. A dramatic increase in the aggregation of polyaniline is observed. Authors believe that this is due to the polymer precipitating more rapidly from the reaction medium. The addition of increased oxidant changes the kinetics of the polymerization reaction. As the oxidant is increased, the polymer precipitates more rapidly from the reaction and becomes more aggregated. The aniline/oxidant molar ratio can range from 1:0.1 to 1:.

It is also found that the addition of a second solvent to the reaction medium allows the polyaniline to remain in solution for a significantly longer time. The solvent is so chosen as to partially dissolve the polyaniline. For example, polyaniline was synthesized in aqueous hydrochloric acid with the addition of NMP. NMP was added from 0.1% To 100% relative to the acid solution. Polyaniline synthesized in this fashion did not precipitate from the reaction medium even after 1 hour of polymerization. The area of the high molecular weight fraction in this polymer decreased. It was also observed that the actual molecular weight of the polymer increased because the extent of polymerization increases as the polymer and oxidant are both in solution. An exeplary list of solvents useful to add to the polymerization reaction includes: is:

N-methyl pyrrolidinone (NMP)
dimethyl sulfoxide (DMSO)
dimethyl formamide (DMF)
pyridine
toluene
xylene
m-cresol
phenol
dimethylacetamide
tetramethylurea
N-cyclohexylpyrrolidinone
pyrrolidinone
N, N' dimethyl propylene urea (DMPU)
benzyl alcohol
cyclohexanone
ethyl lactate
propylene glycol methyl ether acetate
methylethylketone
diglyme
methylisobutylketone
tetrahydrofuran
acetonitrile
diethylmalonate
propylene glycol methyl ether
isopropanol
methanol
cellosolvealcohol This list is exemplary only and not limiting. The amount of the solvent relative to the aqueous acid solution is from 0.1 to 100%, more preferably from 1 to 50%, and most preferably from 2 to 30%. An exemplary list of acids used in the polymerization reaction include, aqueous acetic acid, sulfuric acid, hydrochloric acid, oxalic acid, formic acid, toluenesulfonic acid, naphthalene sulfonic acid, camphor sulfonic acid, acrylamidopropanesulfonic acid, dodecylbenzenesulfonic acid, and so on. This list is exemplary only and not limiting.

The oxidant can be ammoniumperoxydisulfate, FeCl3, hydrogen peroxide, oxygen, periodates such as sodium periodate, chromates, such as potassium dichromate, peracids such as m-chloroperoxybenzoic acid, lead acetate and so on.

While the present invention has been described with respect to preferred embodiments, numerous modifications, changes, and improvements will occur to those skilled in the art without departing from the spirit and scope of the invention.

EXAMPLES

General Synthesis: The unsubstituted polyaniline in the emeraldine form is synthesized by the chemical oxidative polymerization of aniline in 1N aqueous HCl using ammonium peroxydisulfate as an oxidizer. Polyaniline can also be oxidatively polymerized electrochemically as taught by W. Huang, B. Humphrey, and A. G. MacDiarmid, J. Chem. Soc. Faraday Trans. 1,82, 2385, 1986. In the chemical synthesis, the aniline monomer is added to the aqueous hydrochloric acid and cooled to 0° C. A separate oxidant solution is prepared by dissolving the oxidant, ammonium peroxydisulfate, in aqueous hydrochloric acid. This solution is also cooled to 0° C. The molar ratio of aniline to the oxidant is 1:0.25. The oxidant solution is then added to the aniline solution. Upon addition of the oxidant, the solution turns green and within minutes the polymer precipitates from the reaction medium. In addition, the viscosity of the mixture increases. The reaction is allowed to continue for about 1 hour at 0° C. and 2 hours at room temperature. During this time, the reaction is proceeding heterogeneously as the polymer has precipitated from the medium whereas the oxidant remains soluble in the medium and thus, the growing polymer and the oxidant are in different phases. After this time, the polyaniline hydrochloride salt power is filtered and washed with aqueous hydrochloric acid followed by water. The polymer is then neutralized to the non-doped base form by placing the powder in aqueous ammonium hydroxide for ≅12 hours. The non doped polymer is then filtered, washed with ammonium hydroxide, then washed with methanol and dried. The polymer at this stage is in the undoped emeraldine base form as a powder.

Substituted (either on the aromatic ring or on the nitrogen) polyanilines in the emeraldine form are synthesized in the same fashion as above but using the appropriate substituted aniline monomer in the polymerization reaction. Copolymers are made by the oxidative polymerization of one or more monomers. Other acids can also be used in the polymerization reaction other than hydrochloric acid. Aqueous acetic acid, sulfuric acid, organic sulfonic acids, such as aqueous toluenesulfonic acid, dodecylbenzenesulfonic acid, camphorsulfonic acid, and so on. The o-ethoxy substituted polyaniline was prepared by oxidative polymerization of o-ethoxy aniline in 1N hydrochloric acid as described above. Copolymers having various amounts of o-ethoxy content were synthesized by polymerizing o-ethoxyaniline and aniline in aqueous 1N hydrochloric acid. The amount of o-ethoxy content in the final polymer was controlled by varying the feed ratio of this monomer in the initial polymerization reaction. Other ring substituted derivatives such as the o-hydroxyethyl substituted polyaniline described in U.S. application Ser. No. 08/595,853 filed on Feb. 2/96 entitled, "Cross-linked electrically conductive polymers and precursors thereof" and U.S. application Ser. No. 08/594/680 filed on Feb 2, 19996 entitled, "Methods of fabricating cross-linked electrically conducting polymers and precursors thereof", the teachings of which are incorporated herein by reference.

The substituted and unsubstituted emeraldine base powder is generally processed by dissolving the powder in an organic solvent. The unsubstituted emeraldine base was dissolved in NMP at a 5–10% concentration or DMPU. The solution can be used to spin-coat films of the emeraldine base polymer on silicon wafers, quartz wafers, salt plates, and so on. These films were on the order of 500 A to 1.0 μm. Thicker films (on the order of 50 to 200 μm) were made by solution casting techniques in which the solution was poured into an aluminum pan or glass dish and placed into a vacuum oven at 60° C. for 24 hours. The solution can also be used to process the material into a structural part or into a fiber. The substituted emeraldine base such as the o-ethoxy substituted emeraldine base was more soluble than the unsubstituted emeraldine base. This polymer can be dissolved in cyclohexanone, tetrahydrofuran, ethyllactate and so on. A solution was made in cyclohexanone (5% solids) and this solution was used to process films (thin and thick).

Modified Synthesis 1: The polymerization of aniline described above was carried out with the following modification. The aniline/oxidant molar ratio was increased to 1:0.5. The polymer was isolated and neutralized as described above.

Modified Synthesis 2: The polymerization of aniline described above was carried out with the following modification. The aniline/oxidant molar ratio was increased to 1:0.75. The polymer was isolated and neutralized as described above.

Modified Synthesis 3: The polymerization of aniline described above was carried out with the following modification. The aniline/oxidant molar ratio was increased to 1:1.0. The polymer was isolated and neutralized as described above.

The polyanilines synthesized by the various methods described above were characterized by gel permeation chromatography, ultra-violet/visible absorption, conductivity, afm, infra-red and wide angle x-ray scattering. Gel permeation chromatography indicates that as the oxidant is increased in the synthesis, the area of the high molecular weight fractions increase indicating that the aggregation in the polymer increases. UV/visible absorption indicate that the $\lambda$max of the exciton absorption peak of these polymers shifts towards the blue as the oxidant in the synthesis increases. This shows that the aggregation which increases as the oxidant increases results in a decrease in the conjugation of the polymer. AFM also indicates that the cluster size of the aggregates increases as the oxidant level increases. Wide angle X-ray scattering studies indicate that as the aggregation in these polymers increase, the crystallinity of the polymer decreases. Thus, changing the oxidant level in the polymerization reaction which in turn changes the polymerization kinetics and the rate of polymer precipitation, dramatically impacts the morphology of the polymer, in particular the level of aggregation and the degree of crystallinity.

Modified Synthesis 4: Aniline monomer was dissolved in aqueous hydrochloric acid. To this solution was added an organic solvent, N-Methylpyrrolidinone. Various synthesis were done in which the amount of N-Methylpyrrolidinone ranged from 0.1% to 100% Relative to the aqueous acid solution. The oxidant was dissolved in aqueous hydrochloric acid. Upon addition of the oxidant to the aniline solution, the solution turned color indicating polymerization but the polymer did not precipitate within minutes as described above. For 10% NMP and higher levels, the polymer did not precipitate for at least one hour of polymerization. The polymer which was isolated from this synthesis exhibited decreased levels of aggregation.

Modified Synthesis 5: Aniline monomer was dissolved in aqueous hydrochloric acid. To this solution was added an organic solvent, Dimethylene propylene urea. Various synthesis were done in which the amount of Dimethylene propylene urea ranged from 0.1% to 100% Relative to the aqueous acid solution. The oxidant was dissolved in aqueous hydrochloric acid. Upon addition of the oxidant to the aniline solution, the solution turned color indicating polymerization but the polymer did not precipitate within minutes as described above. For 10% dimethylene propylene urea, and higher levels, the polymer did not precipitate for at least one hour of polymerization. The polymer which was isolated from this synthesis exhibited decreased levels of aggregation.

Modified Synthesis 6: Aniline monomer was dissolved in aqueous hydrochloric acid. To this solution was added an organic solvent, Dimethylacetamice. Various synthesis were done in which the amount of Dimethylacetamide ranged from 0.1% to 100% Relative to the aqueous acid solution. The oxidant was dissolved in aqueous hydrochloric acid. Upon addition of the oxidant to the aniline solution, the solution turned color indicating polymerization but the polymer did not precipitate within minutes as described above. For 10% dimethylacetamide, and higher levels, the polymer did not precipitate for at least one hour of polymerization. The polymer which was isolated from this synthesis exhibited decreased levels of aggregation.

A number of other solvents were used in the synthesis of polyaniline. The general synthesis was similar to that described above.

What is claimed is:

1. A method of fabricating polymers selected from the group consisting of precursors to electrically conductive polymers and electrically conductive polymers, said polymers having a level of aggregation and a morphology, comprising:

providing polymerizable units;

polymerizing said units to form said polymer, said polymerizing having a rate of polymerization and a kinetics of precipitation;

controlling said rate and controlling said kinetics to control said level of aggregation and said morphology of said polymer.

2. A method according to claim 1 further including an additive, wherein said rate and said kinetics are controlled by controlling an amount of said additive.

3. A method according to claim 2 wherein said additive is present in a molar amount from about 1:0.1 to about 1:1 polymerizable units to additive ratio.

4. A method according to claim 2 wherein said additive is an oxidant.

5. A method according to claim 4 wherein said oxidant is present in a molar amount from about 1:0.1 to about 1:1 polymerizable units to oxidant ratio.

6. A method according to claim 4 wherein said oxidant is selected from the group consisting of one or more of ammoniumperoxydisulfate, FeC13, hydrogen peroxide, oxygen, periodates, chromates, peracids and lead acetate.

7. A method according to claim 2 further including a first solvent and wherein said additive is a second solvent.

8. A method according to claim 7 wherein said second solvent is selected from the group consisting of one or more of N-methyl pyrrolidinone (NMP) dimethyl sulfoxide (DMSO) dimethyl formamide (DMF) pyridine toluene xylene m-cresol phenol dimethylacetamide tetramethylurea N-cyclohexylpyrrolidinone pyrrolidinone N, N' dimethyl propylene urea (DMPU) benzyl alcohol cyclohexanone ethyl lactate propylene glycol methyl ether acetate methylethylketone diglyme methylisobutylketone tetrahydrofuran acetonitrile dietylmalonate gamma-butyrolactone propylene glycol methyl ether isopropanol methanol cellosolvealcohol anisole.

9. A method according to claim 7 wherein said second solvent is present in an amount from about 0.1% to about 100% of first solvent.

10. A method according to claim 2 wherein said additive is selected from the group consisting of one or more of a salt, an oxidant, an acid and a solvent.

11. A method according to claim 2 wherein said additive slows said kinetics of precipitation.

12. A method according to claim 1 wherein said polymerizable units are selected combinations thereof.

13. A method according to claim 1 wherein said precursor is selected from the group consisting of substituted and unsubstituted polyparaphenylenes, polyparaphenylevevinylenes, polyanilines, polyazines, polythiophenes, polythianaphthenes, poly-p-phenylene sulfides, polyfuranes, polypyrroles, polyselenophenes, polyacetylenes formed from soluble precursors and combinations thereof and copolymers of monomers thereof.

14. A method according to claim 1 wherein said electrically conductive polymer is selected from the group consisting of substituted and unsubstituted polyparaphenylenes, polyparaphenylevevinylenes, polyanilines, polyazines, polythiophenes, polythianapthenes, poly-p-phenylene sulfides, polyfuranes, polypyrroles, polyselenophenes, polyacetylenes formed from soluble precursors and combinations thereof and copolymers of monomers thereof.

15. A method according to claim 1 wherein said rate is controlled by creating a homogenous reaction of all reactants which are controlled to be in the same phase.

16. A method according to claim 1 wherein said kinetics are controlled by creating a homogenous reaction of all reactants which are controlled to be in the same phase by the addition of said additive.

17. A method according to claim 1 wherein said level and morphology are predetermined for a desired level of said level of aggregation and a desired morphology of said morphology.

18. A method according to claim 17 wherein said desired level and said desired morphology are predetermined by experimental or theoretical determination to determine said desired level and said desired morphology.

19. A method according to claim 1 wherein said polymer is a polyaniline having structural formula:

wherein each R can be H or any organic or inorganic radical; each R can be the same or different; wherein each $R^1$ can be H or any organic or inorganic radical, each $R^1$ can be the same or different; $x \geq 1$; $x \geq 2$; y has a value of 0 to 1.

20. A method according to claim 1 wherein said polymer is a polyaniline having structural formula:

wherein each R can be H or any organic or inorganic radical; each R can be the same or different; wherein each $R^1$ can be H or any organic or inorganic radical, each $R^1$ can be the same or different; $x \geq 1$; $x \geq 2$; y has a value of 0 to 1.

21. A method according to claim 6 wherein said chromate is potassium dichromate.

22. A method according to claim 6 wherein said periodate is m-chloroperoxybenzoic acid.

23. A method according to claim 1 further including a wherein said rate at which said polymer is formed and said rate at which said polymer precipitates from solution significantly impacts said morphology of said polymer, the precipitation of said polymer is controlled so that said polymer does not precipitate too soon from the reaction medium, thereby getting the opportunity for said solvent to solvate said polymer to allow chains of said polymer to disentangle from each other and to expand.

* * * * *